US012354495B2

(12) United States Patent
Park et al.

(10) Patent No.: US 12,354,495 B2
(45) Date of Patent: Jul. 8, 2025

(54) EXPECTORATED BLOOD SPATTER GENERATOR AND METHOD OF GENERATING EXPECTORATED BLOOD SPATTER USING THE SAME

(71) Applicant: REPUBLIC OF KOREA (NATIONAL FORENSIC SERVICE DIRECTOR MINISTRY OF THE INTERIOR AND SAFETY, Wonju-si (KR)

(72) Inventors: Nam Kyu Park, Bucheon-si (KR); Byung Seon Moon, Busan (KR); Jae Mo Goh, Seoul (KR); Jin Pyo Kim, Daejeon (KR); Young Il Seo, Wonju-si (KR); Eunah Joo, Wonju-si (KR); Jehyun Lee, Wonju-si (KR)

(73) Assignee: REPUBLIC OF KOREA (NATIONAL FORENSIC SERVICE DIRECTOR MINISTRY OF THE INTERIOR AND SAFETY), Wonju-si (KR)

( * ) Notice: Subject to any disclaimer, the term of this patent is extended or adjusted under 35 U.S.C. 154(b) by 491 days.

(21) Appl. No.: 17/848,604

(22) Filed: Jun. 24, 2022

(65) Prior Publication Data

US 2023/0326374 A1    Oct. 12, 2023

(30) Foreign Application Priority Data

Apr. 11, 2022    (KR) .................. 10-2022-0044603

(51) Int. Cl.
*G09B 23/30* (2006.01)
*G09B 23/12* (2006.01)

(52) U.S. Cl.
CPC .......... *G09B 23/303* (2013.01); *G09B 23/12* (2013.01)

(58) Field of Classification Search
CPC ....... G09B 23/28; G09B 23/30; G09B 23/303
See application file for complete search history.

(56) References Cited

U.S. PATENT DOCUMENTS

| 6,093,475 | A | * | 7/2000 | Geller | ....................... | A41G 7/02 |
| | | | | | | 2/9 |
| 10,846,872 | B2 | * | 11/2020 | Park | ....................... | G01B 11/26 |
| 11,087,642 | B2 | * | 8/2021 | Park | ....................... | G09B 23/34 |
| 11,741,607 | B2 | * | 8/2023 | Park | ....................... | G06T 7/97 |
| | | | | | | 382/128 |
| 2019/0385487 | A1 | | 12/2019 | Park et al. | | |
| 2023/0326363 | A1 | * | 10/2023 | Park | ....................... | G09B 19/00 |
| | | | | | | 434/219 |

OTHER PUBLICATIONS

Daniel V. Christman, "Expirated Bloodstain Patterns" (Year: 1991).*
Korean Office Action dated Mar. 12, 2024 for corresponding Korean Patent Application No. 10-2022-0044603, along with English machine translation (9 pages).
Daniel V. Christman, "Expirated Bloodstain Patterns", Bevel, Gardner & Associates Inc., 1991, pp. 1-5, cited in NPL No. 1.

* cited by examiner

*Primary Examiner* — Kurt Fernstrom
(74) *Attorney, Agent, or Firm* — Hauptman Ham, LLP

(57) ABSTRACT

An expectorated blood spatter generator includes: a compressed air ejection unit configured to eject compressed air through an air nozzle; and a blood ejection unit having one end connected to the air nozzle and ejecting blood through a blood nozzle by pressure of compressed air being ejected.

9 Claims, 5 Drawing Sheets

EXPECTORATED BLOOD SPATTER GENERATOR AND METHOD OF GENERATING EXPECTORATED BLOOD SPATTER USING THE SAME

CROSS-REFERENCE TO RELATED APPLICATION

This application claims the benefit of Korean Patent Application No. 10-2022-0044603, filed on Apr. 11, 2022, in the Korean Intellectual Property Office, the disclosure of which is incorporated herein in its entirety by reference.

BACKGROUND

1. Field

One or more embodiments relate to an expectorated blood spatter generator and a method of generating expectorated blood spatter using the same.

2. Description of the Related Art

In criminal cases, bloodstain pattern analysis plays an important role in reconstructing the scene of bloodshed.

Among bloodstain types, scattered bloodstains, which are formed by splashing blood, are important bloodstains that can be used to determine the act of hitting.

Among scattered bloodstains, expectorated blood spatter is a bloodstain caused by the ejection of blood from the respiratory tract, and is easy to morphologically confused with other scattered bloodstains (bloodstains formed when swinging a crime tool or bloodstains caused by actions such as hitting a bleeding area).

Therefore, it is important to establish objective criteria for determining expectorated blood spatter. In order to establish objective criteria for determination in various surfaces and situations, a device for experimentally generating expectorated blood spatter is needed.

SUMMARY

One or more embodiments include an expectorated blood spatter generator and a method of generating expectorated blood spatter using the same. In more detail, one or more embodiments include a device and a method of experimentally generating expectorated blood spatter, which is a bloodstain ejected from the victim's respiratory tract at a crime scene.

One or more embodiments include an experimental device and a method using the same capable of reproducing expectorated blood spatter generated at the scene of bloodshed considering pressure control of ejected air and an oral structure of the human body.

According to one or more embodiments, an expectorated blood spatter generator includes: a compressed air ejection unit configured to eject compressed air through an air nozzle; and a blood ejection unit having one end connected to the air nozzle and ejecting blood through a blood nozzle by pressure of compressed air being ejected.

In an embodiment, the expectorated blood spatter generator may further include: a blood inlet formed on one side of the blood ejection unit to inject blood from the outside.

In an embodiment, the expectorated blood spatter generator may further include: an input unit configured to receive an input signal according to operation information input by a user; and a control unit configured to control compressed air ejection according to the input signal received by the input unit.

In an embodiment, the operation information may include a pressure level of compressed air being ejected.

In an embodiment, the blood ejection unit may be formed in a straw-type or oral structure type.

According to one or more embodiments, a method of generating expectorated blood spatter using an expectorated blood spatter generator includes: connecting an air nozzle of a compressed air ejection unit to one end of a blood ejection unit; injecting blood into the blood ejection unit; and generating expectorated blood spatter by ejecting compressed air from the compressed air ejection unit and ejecting the blood from the blood ejection unit.

In an embodiment, the expectorated blood spatter generator may further include an input unit and a control unit, and the generating of the expectorated blood spatter may include: inputting operation information into the input unit by a user; and generating expectorated blood spatter by operating the expectorated blood spatter generator by the control unit according to the input operation information.

In an embodiment, the operation information may include a pressure level of compressed air being ejected.

In an embodiment, the method of generating expectorated blood spatter using the expectorated blood spatter generator may further include: analyzing the generated expectorated blood spatter.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
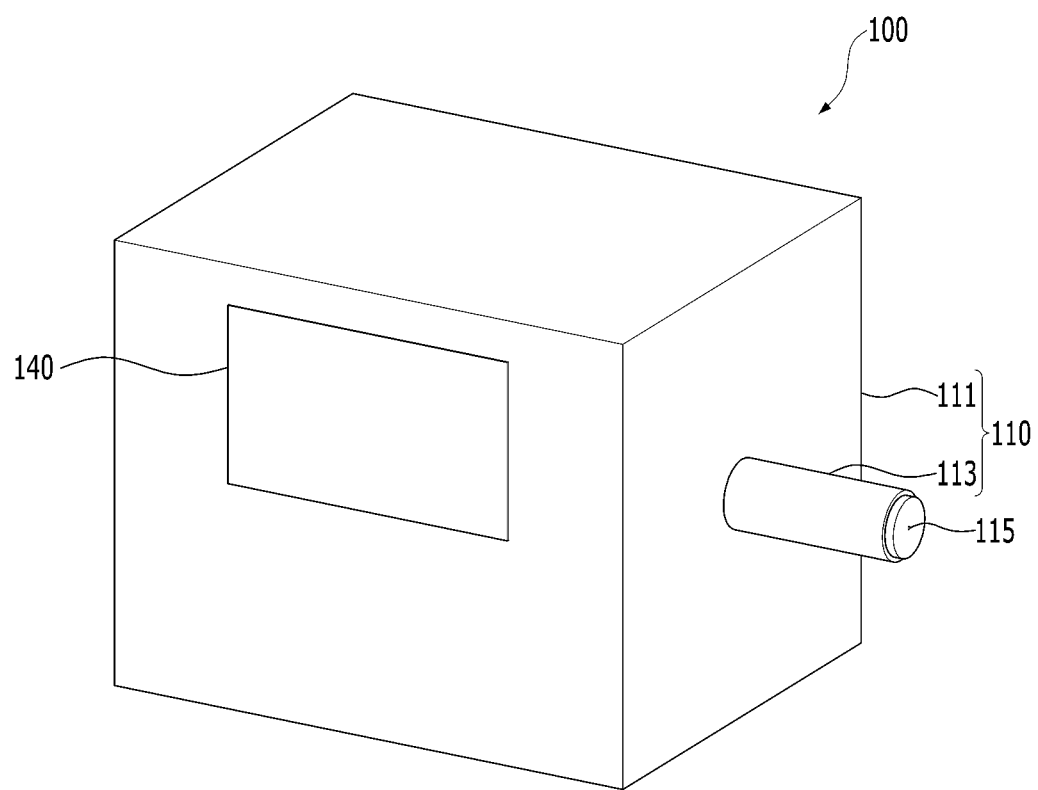
FIG. 1 is a schematic exemplary view of a compressed air ejection unit of an expectorated blood spatter generator according to an embodiment.

Hereinafter, embodiments will be described in detail with reference to the accompanying drawings. The same reference numerals are used to denote the same elements, and repeated descriptions thereof will be omitted.

It will be understood that although the terms "first," "second," etc. may be used herein to describe various components, these components should not be limited by these terms.

An expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of description, the following embodiments are not limited thereto. When a certain embodiment may be implemented differently, a specific process order may be performed differently from the described order. For example, two consecutively described processes may be performed substantially at the same time or performed in an order opposite to the described order.

It will be understood that when a layer, region, or component is connected to another portion, the layer, region, or component may be directly connected to the portion or an intervening layer, region, or component may exist, such that the layer, region, or component may be indirectly connected to the portion.

As used herein, 'expectorated blood spatter' refers to a bloodstain that is formed when the victim's respiratory tract bleeds and the blood is ejected.

Hereinafter, an expectorated blood spatter generator according to an embodiment will be described with reference to FIGS. 1 to 4.

Figure 2:
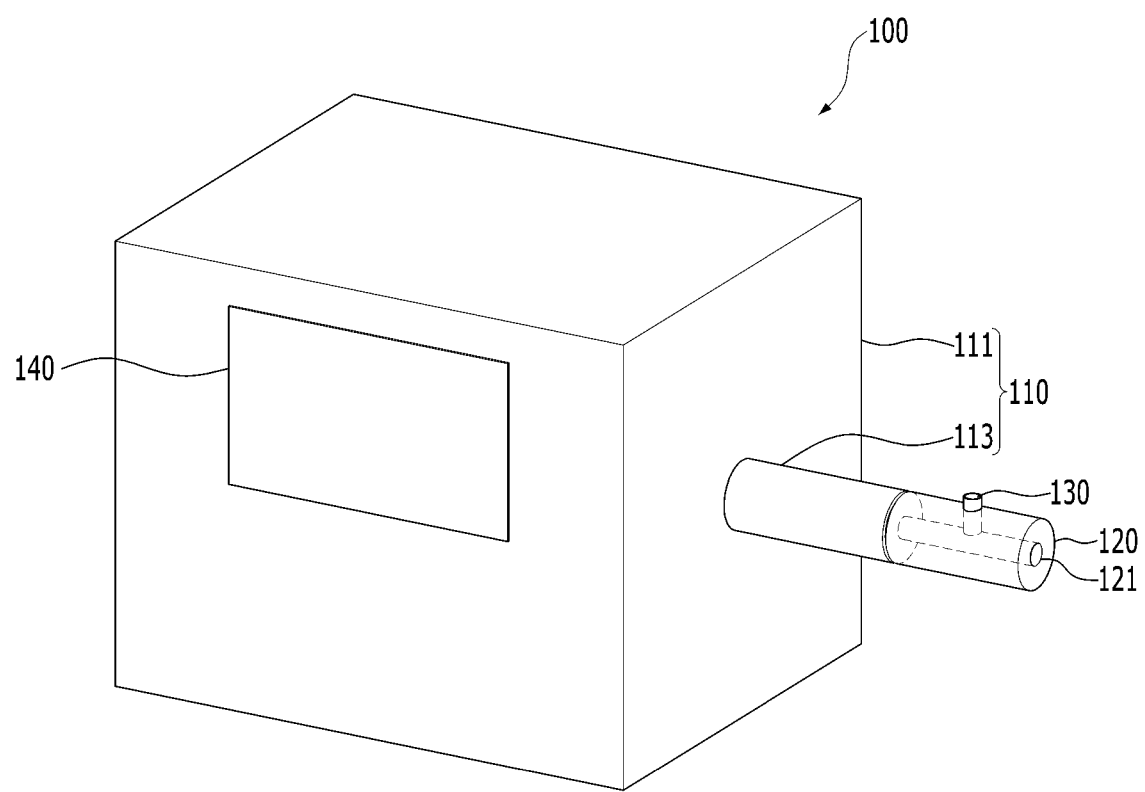
FIG. 2 is an exemplary view illustrating a state in which a straw-type blood ejection unit is mounted on the compressed air ejection unit of FIG. 1.
Figure 3:
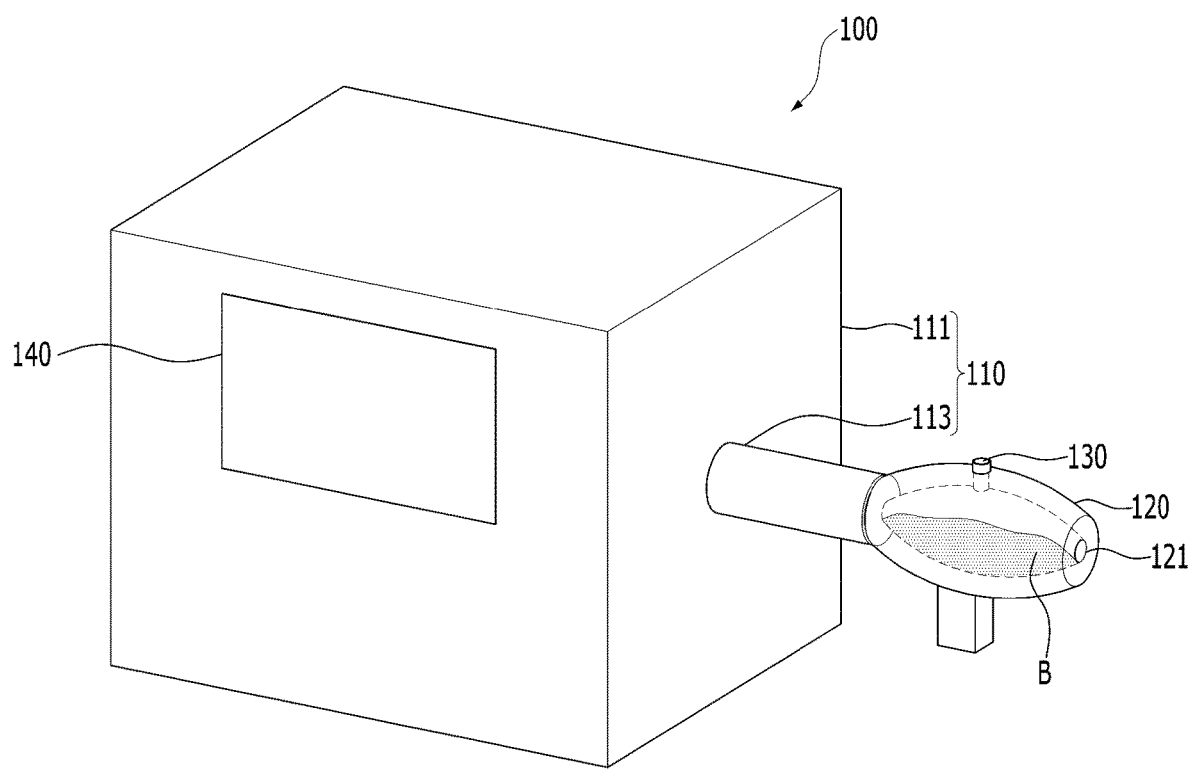
FIG. 3 is an exemplary view illustrating a state in which an oral structure type blood ejection unit is mounted on the compressed air ejection unit of FIG. 1.
Figure 4:
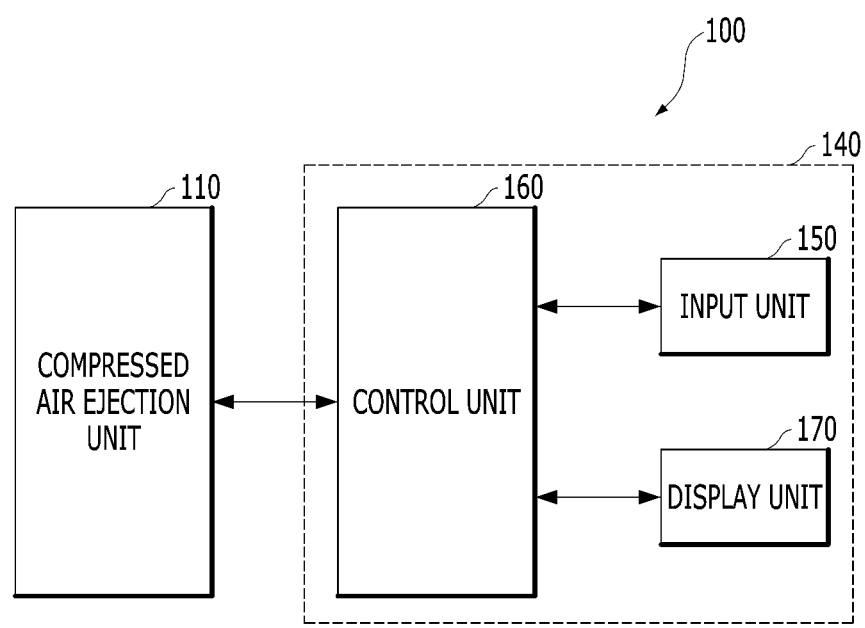
FIG. 4 is a schematic block diagram of an expectorated blood spatter generator according to an embodiment.

FIG. 1 is a schematic exemplary view of a compressed air ejection unit of an expectorated blood spatter generator according to an embodiment, and FIGS. 2 and 3 are exemplary views illustrating a state in which a blood ejection unit is mounted on the compressed air ejection unit of FIG. 1. FIG. 4 is a schematic block diagram of an expectorated blood spatter generator according to an embodiment.

Referring to FIGS. 1 to 4, an expectorated blood spatter generator 100 according to an embodiment may include a compressed air ejection unit 110, a blood ejection unit 120, a blood inlet 130, an input unit 150, a control unit 160, and a display unit 170.

The compressed air ejection unit 110 may eject compressed air through an air nozzle 115.

For example, the compressed air ejection unit 110 may include a body 111 and a connection unit 113. The body 111 is formed to accommodate compressed air therein and to apply pressure to the compressed air by operating a piston (not shown) or the like. As such, the compressed air ejected by the pressure may be discharged through the air nozzle 115.

As an embodiment, the connection unit 113 may directly form a path through which the compressed air of the body 111 is transferred. At this time, one end of the connection unit 113 may be connected to the body 111, and the air nozzle 115 may be formed at the other end of the connection unit 113 to be connected to the blood ejection unit 120 to be described later. The blood ejection unit 120 may be directly inserted into the other end of the connection unit 113 to be fixed. Alternatively, as shown in the drawing, the connection unit 113 may be formed in a cylindrical shape, and a screw thread may be formed on the outside of the connection unit 113 to rotate the one end of the blood ejection unit 120 to be inserted.

As another embodiment, the connection unit 113 may be formed in a groove shape or the like in the body 111 to directly connect the blood ejection unit 120, which will be described later, to the body 111 without separately forming a space for transferring compressed air. In this case, the air nozzle 115 may be formed directly on the body 111.

In this way, the connection unit 113 may connect the body 111 to the blood ejection unit 120, and may transfer compressed air to be ejected to the blood ejection unit 120. Therefore, the connection unit 113 is not limited to a specific shape.

The blood ejection unit 120 may have one end connected to the compressed air ejection unit 110, and may eject blood through a blood nozzle 121 by the pressure of compressed air being ejected. An internal space in which blood is accommodated is formed in the blood ejection unit 120. The internal space of the blood ejection unit 120 is connected to the air nozzle 115 of the compressed air ejection unit 110 to transfer compressed air, so that the blood accommodated in the internal space of the blood ejection unit 120 moves and is ejected through the blood nozzle 121.

The blood ejection unit 120 is formed to be connected to or separated from the compressed air ejection unit 110, so that a user may select one of the blood ejection units 120 to be described later and connect the same to the compressed air ejection unit 110. The user may select the straw-type or oral structure-type blood ejection unit 120 according to the purpose of the experiment.

Referring to FIG. 2, the blood ejection unit 120 may be formed in a straw shape. In the case of using the straw-type blood ejection unit 120, blood is accommodated in the internal space of the straw-type blood ejection unit 120, and may be ejected through the blood nozzle 121 while moving through the internal space formed in a straight line by compressed air transferred from the compressed air ejection unit 110.

Referring to FIG. 3, the blood ejection unit 120 may be formed in an oral structure type. In the oral structure type blood ejection unit 120, blood B is accommodated in an internal space formed with a curved lower surface, and may be ejected from the blood nozzle 121 by transfer of compressed air.

The oral structure type blood ejection unit 120 is closer to the oral structure of the human body than the straw type blood ejection unit 120. Therefore, the scene of bloodshed may be reproduced more precisely by using the oral structure type blood ejection unit 120.

As described above, because there is a difference in the shape of the internal space in which blood is accommodated and transferred to the blood nozzle 121 according to the type of the blood ejection unit 120, a user may select the type of the blood ejection unit 120 according to the purpose of the experiment.

The blood inlet 130 may be formed on one side of the blood ejection unit 120 to inject blood from the outside. The blood injected through the blood inlet 130 may include real human blood or artificial blood. In the case of artificial blood, it is preferable to prepare and use blood having physical properties similar to those of real human blood.

The input unit 150 is a unit for receiving an input signal for controlling or operating the expectorated blood spatter generator 100 according to operation information input by a user, and may be implemented as various types of input units. For example, the input unit 150 may include a keyboard, a key pad, a touch pad, a jog wheel, a jog switch, and the like, but is not limited thereto.

The operation information may include information about the general operation of the expectorated blood spatter generator 100 and a pressure level of compressed air being ejected.

The pressure level of the compressed air being ejected is within a range that may reproduce a case where blood is ejected from the respiratory tract of the human body.

The control unit 160 may control all operations of the expectorated blood spatter generator 100. The control unit 160 may be implemented in various forms such as a central processing unit (CPU), a processor, a microprocessor, an application processor (AP), a micro controller unit (MCU), a microcomputer, or a mini computer. In addition, the control unit 160 may control compressed air ejection according to an input signal received by the input unit 150.

The display unit 170 may display all operating states of the expectorated blood spatter generator 100. In addition, the display unit 170 may display operation information input by a user as described above.

The expectorated blood spatter generator 100 according to an embodiment may form the input unit 150, the control unit 160, and the display unit 170 into one control panel 140.

The control panel 140 may perform the function of the control unit 160 operating the expectorated blood spatter generator 100 according to an input signal received by the input unit 150 while performing the function of the input unit 150 receiving a user's touch input signal. In addition, the control panel 140 may also perform the function of the display unit 170 to display operation information input by a user, an operation state of the expectorated blood spatter generator 100, and the like.

In this case, the control panel 140 may be located on one side of the body 111 to provide convenience to a user.

Figure 5:
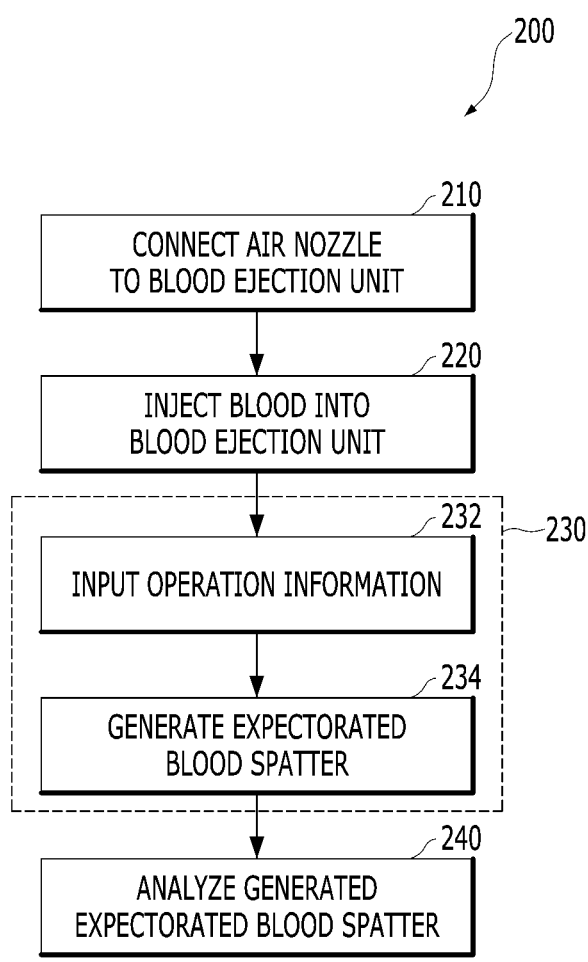
FIG. 5 is a flowchart illustrating a method of generating expectorated blood spatter using an expectorated blood spatter generator according to an embodiment.

Hereinafter, a method 200 of generating expectorated blood spatter using the expectorated blood spatter generator 100 according to an embodiment will be described with reference to FIG. 5. FIG. 5 is the flowchart illustrating the method 200 of generating expectorated blood spatter using the expectorated blood spatter generator 100 according to an embodiment.

The expectorated blood spatter generator 100 according to an embodiment may include the compressed air ejection unit 110, the blood ejection unit 120, and the blood inlet 130, and may further include the input unit 150, the control unit 160, and the display unit 170.

Operation 210 is connecting the air nozzle 115 of the compressed air ejection unit 110 to one end of the blood ejection unit 120.

The compressed air ejection unit 110 may include the body 111 and the connection unit 113. The body 111 is formed to accommodate compressed air therein and to apply pressure to the compressed air by operating a piston (not shown) or the like.

An internal space of the blood ejection unit 120 is connected to the air nozzle 115 of the compressed air ejection unit 110 to transfer compressed air, so that blood accommodated in the internal space of the blood ejection unit 120 moves.

Operation 220 is injecting the blood B into the blood ejection unit 120.

The blood inlet 130 may be formed at one side of the blood ejection unit 120, and the blood B may be injected into the blood ejection unit 120 through the blood inlet 130. The injected blood B is accommodated in the internal space of the blood ejection unit 120.

Operation 230 is ejecting compressed air from the compressed air ejection unit 110 to eject blood from the blood ejection unit 120 to generate expectorated blood spatter.

In this case, operation 230 may include operations 232 and 234.

Operation 232 is user inputting operation information into the input unit 150.

The operation information may include information about the general operation of the expectorated blood spatter generator 100 and a pressure level of compressed air being ejected.

Operation 234 is generating expectorated blood spatter by operating the expectorated blood spatter generator 100 by the control unit 160 according to the input operation information.

When the expectorated blood spatter generator 100 is operated, blood is ejected through the blood nozzle 121 of the blood ejection unit 120 connected to the air nozzle 115 of the compressed air ejection unit 110 according to operation information set by a user. As blood ejected around the expectorated blood spatter generator 100 is stained, expectorated blood spatter may be experimentally generated.

For example, when a user performs an experiment by setting a pressure level of compressed air being ejected differently, the shape of expectorated blood spatter may be different.

Operation 240 is analyzing the generated expectorated blood spatter.

Through the operation information input by the user and the analyzing of the generated expectorated blood spatter, the cause of the victim's bleeding at the scene of bloodshed may be revealed clearly.

According to embodiments, the scene of bloodshed may be accurately reproduced while adjusting the pressure of compressed air being ejected considering the pressure of air ejected from the respiratory tract of the human body.

In addition, according to embodiments, because expectorated blood spatter generated at the scene of bloodshed may be experimentally reproduced, the scene of a violent crime such as a murder may be reproduced and analyzed more accurately and reliably.

It should be understood that embodiments described herein should be considered in a descriptive sense only and not for purposes of limitation. Descriptions of features or aspects within each embodiment should typically be considered as available for other similar features or aspects in other embodiments. Therefore, the scope of the disclosure is defined by the appended claims.

What is claimed is:

1. An expectorated blood spatter generator comprising:
    a compressed air ejection unit configured to eject compressed air through an air nozzle; and
    a blood ejection unit having one end connected to the air nozzle and ejecting blood through a blood nozzle by pressure of compressed air being ejected,
    wherein the blood ejection unit is formed in a straw-type or an oral structure type.

2. The expectorated blood spatter generator of claim 1, further comprising:
    a blood inlet formed on one side of the blood ejection unit to inject blood from the outside.

3. The expectorated blood spatter generator of claim 1, further comprising:
    an input unit configured to receive an input signal according to operation information input by a user; and a control unit configured to control compressed air ejection according to the input signal received by the input unit.

4. The expectorated blood spatter generator of claim 3, wherein the operation information comprises a pressure level of compressed air being ejected.

5. A method of generating expectorated blood spatter using an expectorated blood spatter generator according to claim 1, the method comprising:
   connecting an air nozzle of a compressed air ejection unit to one end of a blood ejection unit;
   injecting blood into the blood ejection unit; and
   generating expectorated blood spatter by ejecting compressed air from the compressed air ejection unit and ejecting the blood from the blood ejection unit.

6. The method of claim 5, wherein the expectorated blood spatter generator further comprises an input unit and a control unit, and
   the generating of the expectorated blood spatter comprises:
     inputting operation information into the input unit by a user; and
     generating expectorated blood spatter by operating the expectorated blood spatter generator by the control unit according to the input operation information.

7. The method of claim 6, wherein the operation information comprises a pressure level of compressed air being ejected.

8. The method of claim 5, further comprising:
   analyzing the generated expectorated blood spatter.

9. The expectorated blood spatter generator of claim 1, wherein the compressed air ejection unit includes:
   a body formed to accommodate the compressed air therein and to apply pressure to the compressed air by operating a piston; and
   a connection unit having a cylindrical shape, wherein one end of the connection unit is connected to the body to transfer the compressed air along a path to the air nozzle formed at the other end.

* * * * *